US012750295B2

(12) United States Patent
Monnier

(10) Patent No.: US 12,750,295 B2
(45) Date of Patent: Sep. 29, 2026

(54) END-TO-END INTEGRITY CHECK OF A COMMUNICATION STREAM

(71) Applicant: THALES, Meudon (FR)

(72) Inventor: Stéphane Monnier, Merignac (FR)

(73) Assignee: THALES, Meudon (FR)

( * ) Notice: Subject to any disclaimer, the term of this patent is extended or adjusted under 35 U.S.C. 154(b) by 386 days.

(21) Appl. No.: 18/534,598

(22) Filed: Dec. 9, 2023

(65) Prior Publication Data

US 2024/0205123 A1 Jun. 20, 2024

(30) Foreign Application Priority Data

Dec. 16, 2022 (FR) ...................................... 2213599

(51) Int. Cl.

| | |
|---|---|
| ***H04L 43/0823*** | (2022.01) |
| ***H04L 9/08*** | (2006.01) |
| ***H04L 9/32*** | (2006.01) |
| ***H04L 49/253*** | (2022.01) |
| *H04L 67/12* | (2022.01) |

(52) U.S. Cl.

CPC ........ *H04L 43/0823* (2013.01); *H04L 9/0816* (2013.01); *H04L 9/3236* (2013.01); *H04L 49/253* (2013.01); *H04L 67/12* (2013.01)

(58) Field of Classification Search

CPC ... H04L 43/0823; H04L 67/12; H04L 9/3236; H04L 2209/84; H04L 9/0816; H04L 49/253

USPC .................................................. 370/252, 392

See application file for complete search history.

(56) References Cited

U.S. PATENT DOCUMENTS

2006/0056391 A1* 3/2006 Rana ........................ H04L 65/65 370/352
2007/0115812 A1* 5/2007 Hughes ................. H04L 1/1887 370/395.21
2011/0162081 A1 6/2011 Lopez et al.
2016/0366109 A1* 12/2016 Lablans ................. G06Q 20/34
2018/0124075 A1 5/2018 Belfy et al.
2019/0327025 A1* 10/2019 Gaderer ................ H04L 43/065

OTHER PUBLICATIONS

Watson et al, “Dependability Analysis of the AFDX Frame Management Design”, Springer Nature, Switzerland, 2018 (Year: 2018).*

(Continued)

*Primary Examiner* — Omer S Mian

(74) *Attorney, Agent, or Firm* — Soquel Group LLC

(57) ABSTRACT

A method of integrity control, an allocation of virtual identifier, to each stream, only known to each transmitter or receiver, located at one end of the stream, a transmission by a transmitter at the end of a stream, of a message including the payload, the value of a counter of transmitted messages, and a transmission aggregate determined from the virtual identifier known to the transmitter, the value, the payload, the reception by a receiver, at the other end of the stream, of the message, and determination of a reception aggregate from the virtual identifier known to the receiver, the value received, the payload received, the end-to-end integrity check by comparing transmission and reception aggregates.

10 Claims, 2 Drawing Sheets

(56) References Cited

OTHER PUBLICATIONS

Watson Venesa et al: "Dependability Analysis of the AFDX Frame Management Design", Aug. 17, 2018 (Aug. 17, 2018), SAT 2015 18th International Conference, Austin, TX, USA, Sep. 24-27, 2015; [Lecture Notes in Computer Science; Lect.Notes Computer], Springer, Berlin, Heidelberg, pp. 188-202.
Ian Land and Jeff Elliott: "Architecting ARINC 664, Part 7 (AFDX) Solutions", Application Note: VIRTEX-4 and VIRTEX-5 FPGAS, No. version 1.0.1 May 22, 2009 (May 22, 2009), pp. 1-25.
FR 2213599, INPI Rapport de Recherche Preliminaire, Jul. 12, 2023, 3 pages.

* cited by examiner

END-TO-END INTEGRITY CHECK OF A COMMUNICATION STREAM

CROSS-REFERENCE TO RELATED APPLICATIONS

This application is a U.S. non-provisional application claiming the benefit of French Application No. 22 13599, filed on Dec. 16, 2022, which is incorporated herein by reference in its entirety.

TECHNICAL FIELD OF THE INVENTION

The present invention relates to a method for checking end-to-end integrity for a communication stream communicated within a time-sensitive network.

The invention further relates to a non-transitory computer-readable medium including a computer program associated with the method.

The invention also relates to a communication port of a time-sensitive network, the communication port being a transmitter or receiver, and configured to be located at an end of a communication stream communicated within the time-sensitive network.

The invention further relates to a time-sensitive network (TSN).

BACKGROUND OF THE INVENTION

The invention belongs to the field of network communication, and more particularly of communication within an avionics network used in aeronautics.

Currently in the field of avionics, only the solution based on the use of the ARINC 664 P7 standard as implemented within the Ethernet network called AFDX™ (Avionics Full Duplex switched ethernet) makes it possible to have a redundant network communication system, which provides at the same time: maximum jitter, that the content is authentic and apt to withstand repetitive transmissions caused, e.g., by a failure or a cyber-attack causing, e.g., a denial of service.

The developments according to the Ethernet standards of the time-sensitive Network (TSN) group of the IEEE address most of the needs in terms of determinism, bandwidth guarantee and redundancy of an aeronautical network.

However, such time-sensitive Ethernet networks currently fail to cover certain properties of the ARINC 664 P7 standard implemented within an AFDX™ network, namely the properties relating to the robustness to malfunctions of network equipment, which remain incompletely covered.

More precisely, the ARINC 664 P7 standard implemented within an AFDX™ network requires in particular that a switch, having a Design Assurance Level (DAL), guarantees the transmission of frames without alteration, hence without the ability to re-compute the Cyclic Redundancy Check (CRC).

The ability to meet such a requirement associated with the AFDX™ network is very difficult to demonstrate within standard IT products, also called COTS (commercial off-the-shelf) products, which can reconstruct an Ethernet frame and have the CRC calculation function for supporting certain protocols such as the IEEE802.1Q VLAN tagging.

In addition, the ARINC 664 P7 standard implemented within an AFDX™ network provides the specification of robustness capabilities against very specific defects such as the repetition, on the part of a transmitter, of the same frame or the discontinuity of a transmission sequence. Such a specification is not addressed within the Ethernet standards of the TSN group of IEEE.

The ARINC 664 P7 standard implemented within an AFDX™ network has the drawback of being implemented only by proprietary IT equipment conforming to the AFDX™ network that is more expensive than COTS products and not optimal in terms of bandwidth.

SUMMARY OF THE INVENTION

The subject matter of the invention is to remedy the drawbacks of the prior art by proposing an alternative solution to AFDX™ network communication while also addressing the same requirements in terms of robustness against network equipment malfunctions.

To this end, the invention proposes a method of checking the integrity of an end-to-end communication stream communicated within a time-sensitive network TSN, the time-sensitive network TSN being an avionics communication network, the method including:

- a preliminary phase of virtual allocation of a virtual identifier to each communication stream configured to be communicated within the time-sensitive network TSN, the virtual identifier being known only to each communication port, transmitter or receiver, configured to be located at one end of a communication stream
- a message transmission phase implemented by a transmitter communication port located at one end of a communication stream, the transmission phase including, for each message transmitted within the stream:
  - incrementing the value of a counter of transmitted messages;
  - the determination of a transmission aggregate for integrity check obtained from:
    - the virtual identifier of the communication stream known to the transmitter communication port,
    - the value of the counter of transmitted messages;
    - the payload to be transmitted;
  - the transmission of the message, within the stream, the transmitted message including at least the payload, the value of the counter of transmitted messages, and the transmission aggregate;
- a reception phase of the message implemented by a receiver communication port located at the other end of the communication stream, the receiver communication port including a counter of received messages, the reception phase including, for each message received:
  - the reception of the message within the stream, the received message including at least the payload, the value of the counter of transmitted messages and the transmission aggregate,
  - the determination of a transmission aggregate for integrity check, obtained from:
    - the virtual identifier of the communication stream known by the receiver communication port,
    - the value of the counter of transmitted messages, received within the received message;
    - the payload received;
    - the end-to-end integrity check by comparing the transmission aggregate to the reception aggregate, a difference between the transmission aggregate and the reception aggregate activating the rejection of the received message, whereas on the other hand, when the transmission aggregate and the reception aggregate are identical, the received message is accepted.

Thereby, the present invention proposes the adoption of an end-to-end principle, for verifying that any communication within a communication stream within the time-sensitive network TSN is integrated, implementing first of all a prior allocation of a virtual identifier to each communication stream configured to transit within the network, such virtual identifier being known to each communication port, transmitter or receiver, configured to be located at one end of a communication stream.

It should be noted that during transmission as such, such a virtual identifier is not transmitted and hence does not transit through the network, unlike the transmitted message including at least the payload, the value of the counter of transmitted messages, and the transmission aggregate.

It is thus impossible to intercept, maliciously, such a virtual identifier during the transmission of a message or to imagine a failure making it possible to guess the identifier, which drastically reduces the risk of reconstitution of the transmission aggregate, the transmission aggregate requiring, for being determined (i.e., obtained by computation), to know the virtual identifier combined with the value of the counter of transmitted messages and with the payload.

The method of checking end-to-end integrity of a communication stream communicated within a time-sensitive network TSN proposed according to the invention can further have one or a plurality of the features below, taken independently or according to all technically feasible combinations:

- the transmission aggregate and the reception aggregate are obtained using the same aggregate determination function, the aggregate determination function providing only irreversible aggregates;
- the aggregate determination function is a hash function;
- the hash function is an SHA-1 function;
- the hash function is an SHA-2 function;
- the reception phase further includes checking the correct sequencing according to which if the value of the counter of transmitted messages is equal to the current value of the counter of received messages plus one or plus two, then the received message is also accepted, and the current value of the counter of received messages is then updated by becoming equal to the value of the counter of transmitted messages.

A further subject matter of the invention is a computer program including software instructions which, when executed by a computer, implement a method of checking the end-to-end integrity of a communication stream communicated within the time-sensitive network TSN, as defined hereinabove.

Thereafter, the reference to a computer program which, when executed, performs any of the above-mentioned software instructions, is not limited to an application program being executed on a single host computer.

In other words, the terms computer program and software are used thereafter in a general sense to refer to any type of computer code (e.g., an application software, a firmware, a microcode, or any other form of computer instruction) which may be used for programming one or a plurality of processors in order to implement the method of checking the end-to-end integrity of a communication stream communicated within a time-sensitive network TSN.

The invention further relates to a communication port of a time-sensitive network TSN, the communication port being a transmitter or a receiver, and configured to be located at an end of a communication stream communicated within the time-sensitive network TSN, the communication port including a set of elements dedicated to implementing at least in part, the above method of checking the end-to-end integrity of a communication stream, the set of elements including:

- a memory storage space dedicated to the storage of a virtual identifier of each communication stream configured to be communicated within the time-sensitive network TSN;

and at least one of the following two devices corresponding to:

- a message transmission device configured for transmitting at least one message within a communication stream, the transmission device including, for each message transmitted within the communication stream:
  - a counter of transmitted messages the value of which is configured for being incremented at each transmitted message;
  - a module for the determination of a transmission aggregate for integrity check obtained from:
    - the virtual identifier of the communication stream known by the communication port in transmitter mode,
    - the value of the counter of transmitted messages;
    - the payload to be transmitted;
  - a module for transmitting the message, configured for transmitting within the stream, the transmitted message including at least the payload, the value of the counter of transmitted messages and the transmission aggregate;
- a device for receiving a message or messages, configured for receiving at least one message within another communication stream, the reception device including, for each message received within the other communication stream:
  - a counter of received messages;
  - a module for receiving the message, configured for receiving the message within the other stream, the received message including at least the payload thereof, a value of the counter of transmitted messages, and a transmission aggregate,
  - a module for determining a reception aggregate for integrity check, obtained from:
    - the virtual identifier of the other communication stream,
    - the value of the counter of transmitted messages, received within the received message;
    - the payload received;
  - a module for checking end-to-end integrity configured for checking end-to-end integrity by comparing the transmission aggregate to the reception aggregate, a difference between the transmission aggregate and the reception aggregate activating the rejection of the received message, whereas on the other hand, when the transmission aggregate and the reception aggregate are identical, the received message is accepted.

The communication port proposed according to the present invention may also have the features according to which the set of elements, dedicated to implementing at least in part the above method of checking the end-to-end integrity of a communication stream, may be activated/deactivated.

The invention further relates to a time-sensitive network TSN, the time-sensitive network TSN being an avionics communication network and the network including at least two communication ports as described hereinabove.

BRIEF DESCRIPTION OF THE DRAWINGS

Other features and advantages of the invention will be clear from the description thereof which is given below as a non-limiting example, with reference to the enclosed figures, among which.

DETAILED DESCRIPTION

Figure 1:
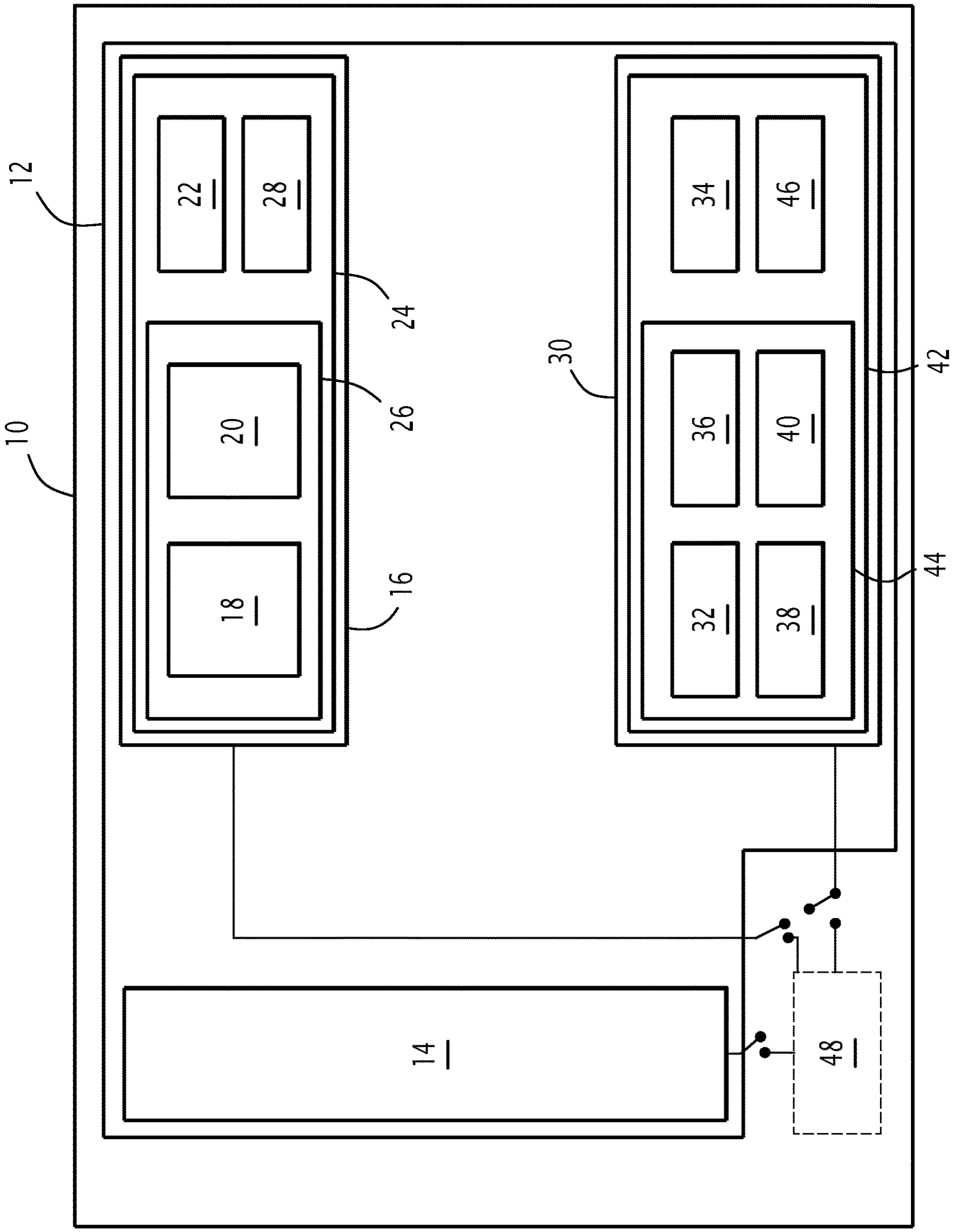
FIG. 1 schematically represents a reception port according to one embodiment of the invention.

As indicated hereinabove, FIG. 1 represents schematically a communication port 10 of a time-sensitive network TSN according to an embodiment of the invention.

Such a communication port 10 is configured to be in transmitter mode or in receiver mode, and is configured to be located at an extremity (i.e., at an end) of a communication stream communicated within the time-sensitive network TSN.

Figure 2:
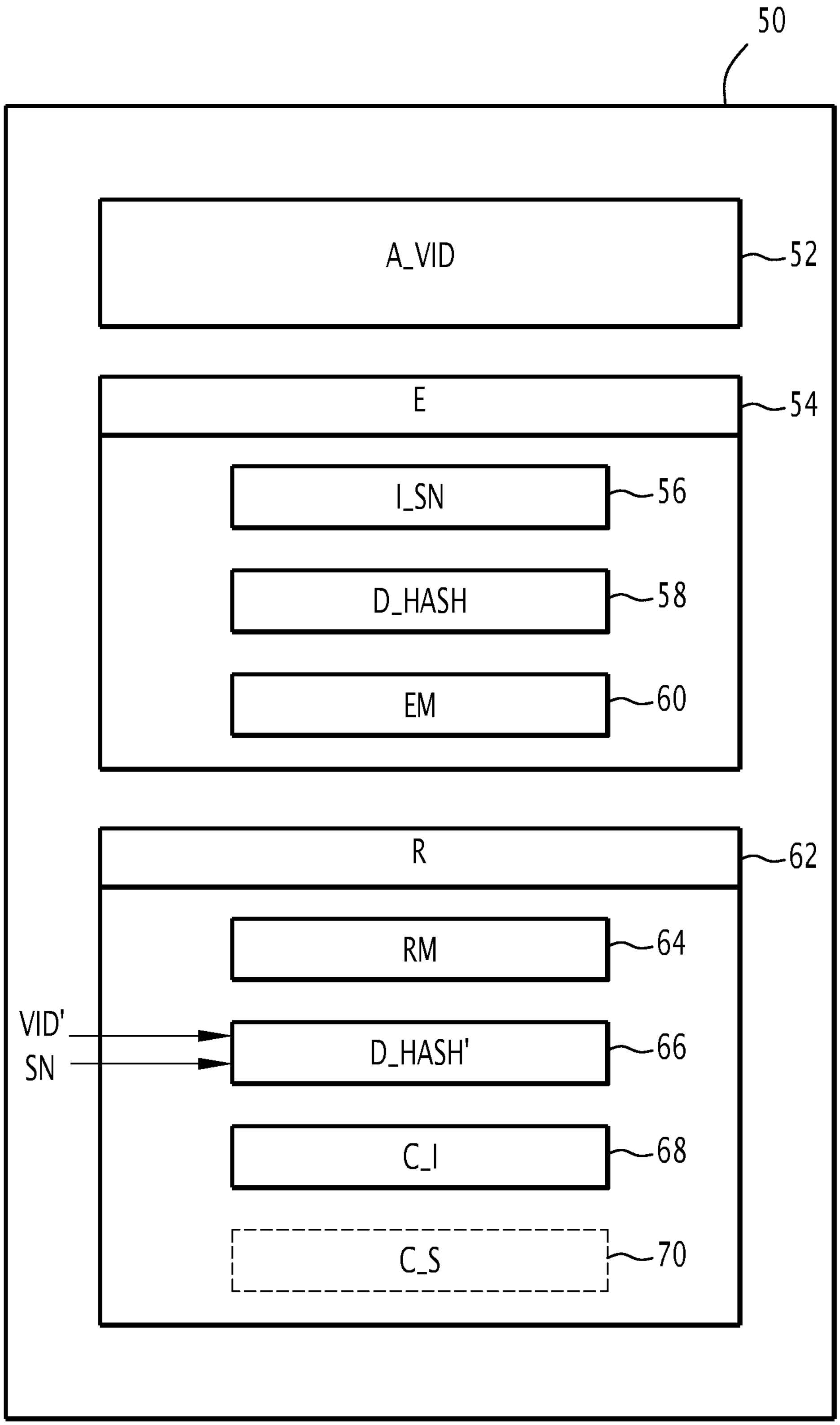
FIG. 2 is a flowchart of the main steps of a method of checking the end-to-end integrity of a communication stream communicated within a time-sensitive network TSN according to an embodiment of the invention.

Communication port 10 according to embodiments of the present invention includes a set 12 of elements dedicated to implementing, at least in part, the method of checking the end-to-end integrity of a communication stream as detailed thereafter with reference to FIG. 2.

According to the present invention, set 12 of elements includes firstly a memory storage space 14 dedicated to the storage of a virtual identifier, thereafter called VID, for a transmitter communication port (i.e., in transmission mode), and VID' for a receiver communication port (i.e., in reception mode), of each communication stream configured to be communicated within the time-sensitive network TSN.

Furthermore, set 12 of elements includes, when communication port 10 is a transmitter communication port (i.e., in transmission mode), a device 16 for transmitting message(s) configured for transmitting at least one message within a communication stream.

Such a transmission device 16 includes, according to embodiments of the present invention, for each message transmitted within the communication stream, a counter 18 of transmitted messages the value of which is configured for being incremented at each transmitted message. Subsequently, the value of the counter of transmitted messages is called SN (Sequence Number).

In addition, such a transmission device 16 further includes, according to embodiments of the present invention, a module 20 for determining a transmission aggregate, hereinafter called HASH, for integrity check.

Such a HASH transmission aggregate is obtained by a determination module 20 from (i.e., using) at least three distinct types of information corresponding to:

- the virtual identifier VID of the communication stream known by the communication port in transmitter mode;
- the value SN of the counter of transmitted messages; and
- the payload of the message to be transmitted.

In addition, transmission device 16 further includes, according to embodiments of the present invention, a module 22 for transmitting as such the message. More precisely, such a transmission module is configured for transmitting within the stream, the sent message including at least the payload, the value SN of the counter of transmitted messages, and the transmission aggregate HASH.

According to an aspect illustrated by FIG. 1, electronic transmission device 16 includes an information processing unit 24 including, e.g., a memory 26 and a processor 28 associated with memory 26.

According to a particular example, counter 18 of transmitted messages and module 20 for determining a transmission aggregate are each produced in the form of a software program, or a software package, executable by processor 28 of electronic transmission device 16 according to the present invention. Memory 26 of electronic transmission device 16 is then apt to store a software for counting transmitted messages and a software for determining a transmission aggregate. Processor 28 is then apt to execute each of the software.

In a variant (not shown), counter 18 of transmitted messages, and module 20 for determining a transmission aggregate are each produced in the form of a programmable logic component, such as an FPGA (Field Programmable Gate Array), or further of a dedicated integrated circuit, such as an ASIC (Application Specific Integrated Circuit).

When electronic transmission device 16 is produced in the form of one or a plurality of software programs, i.e., in the form of a computer program, same is further apt for being recorded on a computer-readable medium (not shown). The computer-readable medium is, e.g., a medium apt to store electronic instructions and to be coupled to a bus of a computer system. As an example, the readable medium is an optical disk, a magneto disk, a ROM memory, a RAM memory, any type of non-volatile memory (e.g., EPROM, EEPROM, FLASH, MVRAM), a magnetic card or an optical card. A computer program containing software instructions is then stored on the readable medium.

Moreover, set 12 of elements includes, when communication port 10 is a receiver communication port (i.e., in reception mode), a device 30 for receiving message(s) configured for receiving at least one message within another communication stream (i.e., distinct from a communication stream the communication port of which is, e.g., in parallel, also transmitter).

Reception electronic device 30 includes, for each message received within the other communication stream, firstly a counter 32 of received messages.

In addition, electronic reception device 30 further includes a module 34 for receiving the message. Reception module 34 is configured for receiving the message within the other stream, the received message including at least the payload thereof, a value SN of the counter of transmitted messages associated with the received message, and a transmission aggregate HASH also associated with the received message.

Furthermore, electronic reception device 30 also includes a module 36 for determining a reception aggregate HASH' for integrity check.

Such a reception aggregate HASH' is obtained by determination module 36 from (i.e., by using) at least three distinct types of information corresponding to

- the virtual identifier VID' of the other communication stream known by the communication port in receiver mode;
- the SN value of the counter of transmitted messages, received within the received message; and
- the payload received from the message received.

In addition, electronic reception device 30 further includes a module (38) for checking end-to-end integrity configured for checking the end-to-end integrity by comparing the transmission aggregate HASH with the reception aggregate HASH', a difference between the transmission aggregate HASH and the reception aggregate HASH' activating rejection of the received message, whereas on the other hand, when the transmission aggregate HASH and the reception aggregate HASH' are identical, the received message is accepted.

As an optional addition electronic reception device 30 further includes a module 40 for checking correct sequencing, configured for determining whether the value SN of the counter of transmitted messages is equal to the current value SN' of the counter of received messages plus one or plus two (i.e., such that SN=SN'+1 or such that SN=SN'+2), and then for accepting the received message, the value SN' of the counter of received messages then being updated by becoming equal to the value SN of the counter of transmitted messages. If, on the other hand, module 40 for checking the correct sequencing detects that SN≠SN'+1 or SN≠SN'+2 in order to be tolerant to the loss of a message, the message received is rejected.

In other words, as soon as HASH≠HASH' the message is rejected for integrity failure.

If HASH=HASH', but SN≠SN'+1 or SN≠SN'+2, then the message is also rejected for sequence failure.

It should be noted that in the particular case of a restart (i.e., reset) of electronic reception device 30, the value SN' is initialized by the value SN of the first message received after the restart (i.e., reset) and no check of correct sequencing is then implemented for the first message received after the restart (i.e., reset).

In other words, when no message has been received, SN' is not yet initialized, and the first message received with the value SN of the counter of transmitted messages is accepted by default.

According to an aspect illustrated by FIG. 1, electronic reception device 30 includes an information processing unit 42 consisting, e.g., of a memory 44 and of a processor 46 associated with memory 44.

According to a particular example, counter 32 of received messages, module 36 for determining a reception aggregate, module 38 for checking end-to-end integrity, and optionally module 40 for checking correct sequencing, are each implemented in the form of a software program or a software brick which may be executed by the processor of the device according to embodiments of the present invention. Memory 44 of electronic reception device 30 is then apt to store a software for counting received messages, a software for determining a reception aggregate, a software for checking end-to-end integrity, and optionally a software for checking correct sequencing. Processor 46 is then apt to execute each of the software.

In a variant (not shown), counter 32 of received messages, module 36 for determining a reception aggregate, module 38 for checking end-to-end integrity, and optionally module 40 for checking correct sequencing, are each produced in the form of a programmable logic component, such as an FPGA (Field Programmable Gate Array), or further in the form of a dedicated integrated circuit, such as an ASIC (Application Specific Integrated Circuit).

When electronic reception device 30 is produced in the form of one or a plurality of software programs, i.e., in the form of a computer program, same is further apt for being recorded on a computer-readable medium (not shown). The computer-readable medium is, e.g., a medium apt to store electronic instructions and to be coupled to a bus of a computer system. As an example, the readable medium is an optical disk, a magneto disk, a ROM memory, a RAM memory, any type of non-volatile memory (e.g., EPROM, EEPROM, FLASH, MVRAM), a magnetic card or an optical card. A computer program containing software instructions is then stored on the readable medium.

As an optional addition, the transmission aggregate and the reception aggregate are obtained using the same aggregate determination function, the aggregate determination function providing only irreversible aggregates.

According to an advantageous option of the optional addition, the aggregate determination function is a hash function.

According to a first optional variant, the hash function is an SHA-1 function, e.g., 80 bits long.

According to a second optional variant, the hash function is an SHA-2 function, e.g., 112 bits long, or further an SHA-2 function such as SHA-256, SHA-512, SHA-224, SHA-384, etc.

It should be noted that to date such SHA hash functions are not integrated into the UDP/IP and Ethernet protocols used, and that such an implementation is thus not obvious for a person skilled in the art.

As an optional addition, the set 12 of elements, dedicated to implementing at least in part the method of checking the end-to-end integrity of a communication stream as described thereafter with reference to FIG. 2, may be activated/deactivated for certain streams in order to make a communication possible with network elements inapt to implement such a method of checking the end-to-end integrity.

In FIG. 1, such an option is illustrated by element 48 suitable for either activating or not activating via a set of switches the elements of set 12, which allows the communication port to participate in the implementation of the method of checking the end-to-end integrity according to the present invention, or in the event of inactivation of set 12, to operate conventionally (i.e., without any integrity check according to the present invention, but with a conventional integrity check such as CRC, unsuitable for taking into account the failure of a switch, e.g., which would recalculate same).

It should be noted that element 48 also makes it possible to activate the transmitter mode or the receiver mode of the communication port by making electronic transmission device 16 active and making electronic reception device 30 inactive, respectively, for the transmitter mode, and, on the other hand, making transmission electronic device 16 inactive and making electronic reception device 30 active for the receiver mode, when the two modes are not implemented in parallel for the communication of two distinct streams where the communication port shown in FIG. 1 is both a transmitter of a first communication stream and a receiver of a second communication stream distinct from the first communication stream.

According to other variants (not shown), communication port 10 is only a transmitter (i.e., in transmission mode only) and in such case does not include reception device 30 described hereinabove, or communication port 10 is only a receiver (i.e., in reception mode only) and in such case does not include transmission device 16 described hereinabove.

Moreover, according to another variant (not shown), when the communication port is “single-mode”, memory storage space 14 is then integrated within transmission device 16 if communication port 10 is only a transmitter (i.e., in transmission mode only), or is integrated within reception device 30 if communication port 10 is only a receiver (i.e., in reception mode only).

As an alternative to FIG. 1, when the communication port is “dual-mode”, i.e., operates as a transmitter communication port and as a receiver communication port, memory storage space 14 is not common to transmission device 16 and reception device 30 as illustrated according to the embodiment shown in FIG. 1, but integrated into each of the two transmission devices 16 and reception device 30, respectively.

An example of the operation of an end-to-end integrity check of a communication stream communicated within a time-sensitive network TSN according to an embodiment of the invention will now be described hereinafter with reference to FIG. 2, the time-sensitive network TSN being in particular an avionics network including at least two communication ports as described hereinabove with reference to FIG. 1.

More precisely, method 50 for maintaining integrity of end-to-end positioning of a communicated communication stream implemented within the time-sensitive network TSN includes, first of all, a first preliminary phase 52 of virtual allocation A_VID of a virtual identifier to each communication stream configured to be communicated within the time-sensitive network TSN, the virtual identifier being known only to each communication port, transmitter or receiver, configured to be located at one end of the communication stream and stored within the dedicated memory storage space 14 as illustrated with reference to FIG. 1.

For example, a communication stream $F_1$ corresponds to a data stream, between a first transmitter communication port $P_1$ (i.e., in transmission mode), at one end of the data stream $F_1$, and a second receiver communication port $P_2$ at the other end of the data stream $F_1$ and is identified with the VID=VID'=63, while a communication stream corresponding to a video stream $F_2$ between the two same ports $P_1$ and $P_2$ is identified with a distinct identifier such that VID=VID'=65.

According to another example, another communication stream $F_3$ corresponds to a data stream between the first transmitter communication port $P_1$ (i.e., in transmission mode), at one end of the data stream $F_3$, and a receiver communication port $P_3$ at the other end of the data stream $F_3$ and is identified with the VID=VID'=91, etc.

Then, for each message to be transmitted, method 50 for maintaining end-to-end integrity of a communication stream includes a phase 54 of transmission E, implemented by a transmitter communication port (i.e., in transmission mode) located at one end of the communication stream considered.

Transmission E phase 54 includes, in particular, the operations described hereafter for each message transmitted within the stream considered.

A first operation 56 of incrementation I_SN of the value SN of a counter 18 of transmitted messages is implemented by the transmitter communication port (i.e., in transmission mode) located at one end of the communication stream considered.

Then, according to an operation 58, the transmitter communication port (i.e., in transmission mode), located at one end of the communication stream considered, implements, via determination module 20, the determination D_HASH of a transmission aggregate integrity check HASH obtained from a triplet of elements of a distinct nature, namely the virtual identifier VID of the communication stream known by the transmitter communication port (i.e., in transmission mode), the value SN of the counter of transmitted messages, and the payload to be transmitted as such within the message.

Then, according to an operation 60, the transmitter communication port (i.e., in transmission mode), located at one end of the communication stream considered, implements, via transmission module 22 thereof, transmission EM as such of the message, within the stream, the transmitted message including at least the payload, the value SN of the counter of transmitted messages, and the transmission aggregate HASH.

A phase 62 of reception R of the message is implemented by a receiver communication port (i.e., in reception mode) located at the other end of the communication stream, the receiver communication port (i.e., in reception mode) including, as seen previously with reference to FIG. 1, a counter 32 of received messages.

Reception R phase 62 includes the operations described thereafter, for each received message described in the stream under consideration.

Firstly, within phase 62, a first receiving operation RM 64 of the message, within the stream is implemented, the received message including at least, as indicated hereinabove, the payload, the value SN of counter 18 of transmitted messages, and the transmission aggregate HASH.

Then, according to an operation 66, the receiver communication port (i.e., in reception mode) located at the other end of the communication stream implements, via determination module 36 thereof, the determination D_HASH' of an reception aggregate integrity check HASH', obtained from a triplet of elements of a distinct nature, namely: the virtual identifier VI' of the communication stream known to the receiver communication port (i.e., in reception mode), the value SN of the counter of transmitted messages, received within the received message, and the payload received.

Reception phase 62 then includes an operation 68, implemented by the receiver communication port (i.e., in reception mode) located at the other end of the communication stream, via control module 38 thereof, for end-to-end integrity check C_I by comparing the transmission aggregate HASH with the reception aggregate HASH'.

Indeed, in case of integrity, the virtual identifier of the known VID stream stored on the transmitter communication port side (i.e., in transmission mode) is identical to the VID' stored on the receiver communication port side (i.e., in reception mode), the stream identifier advantageously never transiting as such within the network when transmitting a message, which drastically reduces the risk of accidental reconstitution of a correct check aggregate from data corrupted during transport.

As a result, in case of integrity, for the same message transmitted via the communication stream considered, the transmission aggregate HASH is identical to the reception aggregate HASH', and the corresponding received message is accepted (i.e., preserved).

On the other hand, during comparison step 68, a difference between the transmission aggregate HASH and the reception aggregate HASH' activates rejection of the received message. In other words, if the integrity check fails because HASH≠HASH' then the message is ignored due to integrity failure.

According to a particular variant, the transmission aggregate HASH and the reception aggregate HASH' are obtained by using the same aggregate determination function, the aggregate determination function providing only irreversible aggregates.

According to an advantageous option of the optional addition, the aggregate determination function is a hash function. Such a hash function is dissimilar to the cyclic redundancy check (CRC) function, which is also conventionally used to check the integrity of frames.

Among the hash functions, the algorithms of the SHA (Secure Hash Algorithm) family make it possible to meet the need for obtaining irreversible aggregates, the SOC (System on Chip) systems henceforth providing an acceleration of the hardware of the hash functions, in particular cryptographic functions, which facilitates the use thereof.

According to a first optional variant, the hash function is an SHA-1 function, e.g., 80 bits long.

According to a second optional variant, the hash function is an SHA-2 function, e.g., 112 bits long, or an SHA-2 function such as SHA-256, SHA-512, SHA 224, SHA-384, etc., the size of the hash value having to result from a compromise with the cost on the size of the payload.

As an optional addition, reception phase 62 further includes an operation 70 of checking the correct sequencing according to which, if the value SN of the counter of transmitted messages is equal to the value SN' of the counter of received messages plus one or plus two (i.e., SN=SN'+1 or SN=SN'+2) then the received message is also accepted, and the value SN' of the counter of received messages is then updated by becoming equal to the value SN of the counter of transmitted messages. Such an option makes it possible to exploit the received value SN of the counter of transmitted messages, in order to check the correct sequencing, in addition to the integrity check previously described, and thereby to resynchronize quickly by losing only one message, the message received corresponding to a continuous sequence evolution so that the message is accepted.

On the other hand, if SN≠SN'+1 or SN≠SN'+2, then the received message is rejected for sequencing failure.

A person skilled in the art would understand that the invention is not limited to the embodiments described, nor to the particular examples of the description, the above-mentioned embodiments and variants being suitable for being combined with one another so as to generate new embodiments of the invention.

The present invention thereby proposes a network communication solution suitable for the requirements of avionics, by taking advantage of the advantages of a time-sensitive network TSN, in terms of cost and bandwidth while being robust against the malfunctions of network equipment.

Moreover, the adoption of the end-to-end principle proposed according to the present invention, which distributes, optionally in an activatable/deactivatable way, the integrity check only on the transmitter and receiver communications ports of the network located at each end of the communications stream, also makes possible the cohabitation of traffic with integrity check and of traffic without integrity check, increasing the level of flexibility of the use of the network.

The invention claimed is:

1. A method for checking end-to-end integrity of a communication stream communicated within a time-sensitive network, the time-sensitive network being an avionics communication network, the method comprising:

- a preliminary phase of virtual allocation of a virtual identifier to each of a plurality of communication streams communicated within the time-sensitive network, wherein the virtual identifier (i) is known only to each communication port, transmitter or receiver, located at one end of a communication stream, and (ii) is not transmitted and does not transit through the network;
- a message transmission phase implemented by a transmitter communication port located at one end of a communication stream, the transmission phase comprising, for each message transmitted within the stream:
  - incrementation of the value of a counter of transmitted messages;
  - determination of a transmission aggregate for integrity check obtained from:
    - the virtual identifier of the communication stream known to the transmitter communication port;
    - the value of the counter of transmitted messages; and
    - a payload to be transmitted; and
  - transmission of the message, within the stream, the transmitted message comprising at least the payload, the value of the counter of transmitted messages, and the transmission aggregate; and
- a reception phase of the message implemented by a receiver communication port located at the other end of the communication stream, the receiver communication port comprising a counter of received messages, said reception phase comprising, for each message received:
  - reception of the message, within the stream, the received message comprising at least the payload, the value of the counter of transmitted messages, and the transmission aggregate,
  - determination of a transmission aggregate for integrity check, obtained from:
    - the virtual identifier of the communication stream known to the receiver communication port,
    - the value of the counter of transmitted messages, received within the received message; and
    - the payload received; and
  - an end-to-end integrity check by comparing the transmission aggregate with the reception aggregate, a difference between the transmission aggregate and the reception aggregate activating rejection of the received message, whereas on the other hand, when the transmission aggregate and the reception aggregate are identical, the received message is accepted.

2. The method according to claim 1, wherein the transmission aggregate and the reception aggregate are obtained using a same aggregate determination function, the aggregate determination function providing only irreversible aggregates.

3. The method according to claim 2, wherein the aggregate determination function is a hash function.

4. The method according to claim 3, wherein the hash function is an SHA-1 function.

5. The method according to claim 3, wherein the hash function is an SHA-2 function.

6. The method according to claim 1, wherein the reception phase further comprises checking the correct sequencing according to which, if the value of the counter of transmitted messages is equal to the current value of the counter of received messages plus one or plus two, then the received message is also accepted, and the current value of the counter of received messages is then updated by becoming equal to the value of the counter of transmitted messages.

7. A non-transitory computer-readable medium including a computer program including software instructions which, when executed by a computer, implement a method to claim 1.

8. A communication port of a time-sensitive network, the communication port being a transmitter or receiver, and configured to be located at an end of a communication stream communicated within the time-sensitive network, the communication port comprising a set of elements dedicated to implementing at least in part, the method of claim 1, the set of elements comprising:

- a memory storage space dedicated to the storage of a virtual identifier of each communication stream communicated within the time-sensitive network, wherein the virtual identifier is not transmitted and does not transit through the network; and
- at least one of the following two devices:
  - a message transmission device transmitting at least one message within a communication stream, the transmission device comprising, for each message transmitted within the communication stream:

a counter of transmitted messages, the value of which is configured for being incremented at each transmitted message;

a module for the determination of a transmission aggregate for integrity check obtained from:

the virtual identifier of the communication stream known by the communication port in transmitter mode;

the value of the counter of transmitted messages; and the payload to be transmitted; and a module for transmitting the message within the stream, the transmitted message comprising at least the payload, the value of the counter of transmitted messages and the transmission aggregate; and a message reception device, receiving at least one message within another communication stream, the reception device comprising, for each message received within the other communication stream:

a counter of received messages;

a module for receiving the message within the other stream, the received message comprising at least the payload thereof, a value of the counter of transmitted messages, and a transmission aggregate;

a module for determining a reception aggregate for integrity check, obtained from:

the virtual identifier of the other communication stream;

the value of the counter of transmitted messages, received within the received message; and the payload received; and a module for checking end-to-end integrity by comparing the transmission aggregate to the reception aggregate, a difference between the transmission aggregate and the reception aggregate activating the rejection of the received message, whereas on the other hand, when the transmission aggregate and the reception aggregate are identical, the received message is accepted.

9. The communication port according to claim 8 wherein said set of elements may be activated/deactivated.

10. A time-sensitive network, the time-sensitive network being an avionic communication network, wherein the network comprises at least two communication ports according to claim 8.

* * * * *